(12) United States Patent
Rasner et al.

(10) Patent No.: US 7,316,201 B2
(45) Date of Patent: Jan. 8, 2008

(54) NON-CLUMPING ANIMAL LITTER GRANULES

(75) Inventors: Kobi Rasner, Tel-Aviv (IL); Nimrod Eitan, Tel-Aviv (IL); Ziv Gilo, Alon Agatll (IL)

(73) Assignee: Cycle Group Limited of Delaware, Mocksville, NC (US)

( * ) Notice: Subject to any disclaimer, the term of this patent is extended or adjusted under 35 U.S.C. 154(b) by 72 days.

(21) Appl. No.: 10/318,254

(22) Filed: Dec. 13, 2002

(65) Prior Publication Data

US 2004/0112297 A1 Jun. 17, 2004

(51) Int. Cl.
*A01K 1/01* (2006.01)

(52) U.S. Cl. .......... 119/172; 119/171; 119/173

(58) Field of Classification Search ....... 119/171, 119/172, 173; 500/439, 428
See application file for complete search history.

(56) References Cited

U.S. PATENT DOCUMENTS

| | | | | |
|---|---|---|---|---|
| 4,437,429 | A * | 3/1984 | Goldstein et al. | 119/173 |
| 4,949,672 | A * | 8/1990 | Ratcliff et al. | 119/173 |
| 4,963,431 | A * | 10/1990 | Goldstein et al. | 442/149 |
| 5,207,830 | A * | 5/1993 | Cowan et al. | 106/672 |
| 5,209,185 | A * | 5/1993 | Chikazawa | 119/171 |
| 5,209,186 | A | 5/1993 | Dewing | |
| 5,329,880 | A | 7/1994 | Pattengill et al. | |
| 5,359,961 | A * | 11/1994 | Goss et al. | 119/173 |
| 5,415,131 | A * | 5/1995 | Dodman | 119/171 |
| 5,526,771 | A * | 6/1996 | Ito | 119/172 |
| 5,664,523 | A * | 9/1997 | Ochi et al. | 119/173 |
| 5,724,915 | A * | 3/1998 | Ochi et al. | 119/173 |
| 5,743,213 | A * | 4/1998 | Fujiura | 119/172 |
| 5,975,018 | A * | 11/1999 | Otoguro | 119/174 |
| 5,975,019 | A * | 11/1999 | Goss et al. | 119/173 |
| 5,992,351 | A * | 11/1999 | Jenkins | 119/173 |
| 6,030,565 | A | 2/2000 | Golan | |
| 6,039,004 | A * | 3/2000 | Goss et al. | 119/172 |
| 6,089,189 | A * | 7/2000 | Goss et al. | 119/173 |
| 6,089,190 | A | 7/2000 | Jaffee et al. | |
| 6,148,768 | A * | 11/2000 | Ochi et al. | 119/172 |
| 6,194,065 | B1 | 2/2001 | Golan | |
| 6,276,300 | B1 | 8/2001 | Lewis, II et al. | |
| 6,287,550 | B1 | 9/2001 | Trinh et al. | |
| 6,371,050 | B1 * | 4/2002 | Mochizuki | 119/172 |
| 6,401,662 | B1 | 6/2002 | Sourek, Jr. | |
| 6,659,042 | B2 * | 12/2003 | Bloomer | 119/172 |
| 7,089,882 | B1 * | 8/2006 | Tsengas | 119/171 |
| 2002/0007800 | A1 * | 1/2002 | Ochi et al. | 119/171 |
| 2004/0244710 | A1 * | 12/2004 | Tsengas et al. | 119/171 |

OTHER PUBLICATIONS

Reade Advanced Materials, Natural and Synthetic Zeolites [online], [retrieved on Jan. 5, 2005] retrieved from the Internet <URL http://www.reade.com/Products/Minerals_and_Ores/zeolites. html>.*

* cited by examiner

*Primary Examiner*—Yvonne R. Abbott
(74) *Attorney, Agent, or Firm*—Birch, Stewart, Kolasch & Birch, LLP

(57) ABSTRACT

Animal litter composed of plural discrete particles, each particle containing both mineral and organic matter. An absorbent artificial granule is made up of absorbent fiber, minerals, and chemicals. The highly absorptive and light-weight litter of this invention substantially reduces litter box malodors, extends usage duration of a given cat litter volume unit, eliminates dust, and increases consumer convenience by substantially reducing the weight of the product in conventionally sized packaging. In one embodiment, an animal litter granule is made up of:: 20-50 weight-% fine absorbent fibers, preferably 25-45 weight-% fine absorbent cellulose fibers; 10-30 weight-% zeolite, preferably 12-30 weight-% zeolite; 10-70 weight-% mineral filler, preferably 16-61 weight-% mineral filler selected from kaolin, titanium dioxide, calcium carbonate, sodium bicarbonate, and mixtures thereof; and 0.5-10 weight-% binder, preferably 0.5-3 weight-% acrylic binder.

10 Claims, No Drawings

NON-CLUMPING ANIMAL LITTER GRANULES

FIELD OF THE INVENTION

The disclosed invention relates to cellulose-based animal litter products. More specifically, this invention relates to non-clumping-type animal litters which are based on artificial granules made from cellulose fibers and zeolite and which may have other malodor reducing and inhibiting elements and other ingredients built into the granules.

BACKGROUND OF THE INVENTION

American families seem to increasingly prefer cats, with their independent natures and reduced need for care, as compared to dogs. Domesticated animals such as cats are provided with litter boxes, where they dispose of their excretions. The performance of the litter product in the litter box can vary greatly, depending upon the precise nature of the product. Key attributes of a non-clumping litter product, regarded as being highly important by cat owners are: odor control, the degree of freedom from dust, and litter care convenience (i.e., supply and removal).

Two major classes of malodors may develop in a litter box: 1) nitrogen-based malodors, involving, for instance, ammonia from decomposed urine and amines from decomposed fecal matter, and 2) sulfur-based malodors, such as mercaptans, from secondary decomposition. Ideally, cat litters should absorb and/or eliminate the formation of both. Malodors due to volatile ammonia are very pH dependent. Ammonia exists in two molecular forms: 1) volatile ammonia ($NH_3$) and 2) non-volatile ammonium ions $NH_4^+$. The equilibrium point between the two forms is at approximately pH 9. The lower the pH from that point, the less the volatile ammonia present. At pH 6.5 and below, ammonia concentration is 0% while non-volatile ammonium ion concentration is 100%.

Originally cat litter products, introduced in 1949, were made of non-swelling clay. Those relatively unsophisticated products are known today as "non-clumping" or "traditional" litters. These clay-based litters are very dusty, and the clay substrates from which they are made has limited absorption capabilities and limited natural malodor suppression capabilities. More recently, in 1989, clumping-type cat litters were introduced. Clumping litters made of bentonite clay are less dusty than traditional ones. Also, the bentonite clay litters are more absorptive and have improved natural odor control qualities.

Operationally, the two types of litters are significantly different. While in both types the method of solid waste removal is essentially the same, they differ with respect to liquid waste removal. Traditional litters simply absorb the urine and hold it. Clumping litters trap the liquid excreta in isolated scoopable clumps, enabling the removal of the urine-laden litter clumps, leaving the remaining litter relatively fresh and free of both liquid and solid excreta. Clumping litters thus provide greater odor control, but this comes at a price of reduced convenience, because a daily scooping routine is mandated, a routine that many non-clumping users find to be an unacceptable burden.

Attempts have been made to improve non-clumping performance by using organic substrates, either natural or artificial. Although organic substrates provide better absorption, and better dust control, they thus far have failed to deliver on the single most important attribute: odor control. Odor control is manifested in two parameters: 1) level of odor suppression and 2) the duration of such suppression. Also, the substrate of organic litters is far less cohesive that is the substrate of clay litters. Organic litters tend to fall apart after a few days in a wet environment in the litter box, turning at that point into a sawdust-like product.

The recent introduction of "Crystal" or "Pearl" type litters, made from silica gel, is one attempt by major animal litter marketers to capitalize on consumer desire for better non-clumping litter. Silica gel litters deliver improved and longer lasting odor control when compared to traditional litters, yet suffer from a very high retail price (being among the most expensive litters ever!) and significant levels of "cat rejection" (that is, cats tend not to like silica gel litters). Another drawback of these litters relates to their aesthetic look after they have absorbed a cat's waste. Silica gel is clear, creating a "see through" effect, unlike other litters that hide the waste. Also, hard and "pointy" silica granules that track out of the litter box can be very painful when stepped on by bare feet.

A non-clumping litter has a tough task to contend with in terms of malodor production dynamics. With "high maintenance" clumping litters, in which solid and liquid waste clumps are removed almost daily, leaving a fresh litter in the box, the groomed litter often lasts 2-3 weeks before full replacement is called for. Replacement eventually becomes necessary due to malodors developing from ongoing build-up of small contaminants originating from broken urine clumps and solid waste remnants "missed" in the clump removal process. In non-clumping litters, however, all urine stays in for the duration of usage, and solid waste stays longer in the tray before being scooped out. In fact, some consumers do not "groom" the litter box at all, they just let it stay untouched until malodors develop and then replace the entire litter tray content.

In non-clumping litters, urine "floods" large portions of the litter that is deployed in the litter tray. Considering that cats normally urinate 3-4 times a day, 20 ml on average each time, it is clear that substantial amounts of urine accumulate. Bacterial load, originating e.g. from the fecal mass, doubles every 20 minutes through natural division, so that large amounts of urine are being decomposed, and usually after 24-36 hours ammonia production is noticeable. After 4-7 days ammonia levels become intolerable. By the time that stage is reached, complexes with fecal-related malodors, also developing as result of bacterial decomposition, mandate entire litter tray content change.

In light of the drawbacks of prior art non-clumping litters, there is a need for a non-clumping litter product that will amalgamate the best properties of all litters: 1) deliver "clumping-litter quality" odor control, 2) provide alternative litter's high absorption, freedom from dust, and "natural" profile, as well as light volume weight, and 3) deliver significantly longer "tray-life" with minimal grooming requirements, as is available with traditional non-clumping litters. To be successful, all of this must be provided in a litter that has high cat acceptance and competitive pricing.

SUMMARY OF THE INVENTION

The animal litter of the present invention comprises plural discrete particles, and each particle contains both mineral and organic matter. That is, in accordance with this invention, an absorbent artificial granule is made up of absorbent fiber, minerals, and chemicals. The granule comprises aggregates of (different) dry fine powdered materials. The highly absorptive and lightweight litter of this invention substantially reduces litter box malodors, extends usage duration of a given cat litter volume unit, eliminates dust, and increases consumer convenience by substantially reducing the weight of the product in conventionally sized packaging.

In one embodiment, this invention provides an animal litter granule made up of: 20-50 weight-% fine absorbent fibers, preferably 25-45 weight-% fine absorbent cellulose fibers; 10-30 weight-% zeolite, preferably 12-30 weight-% zeolite; 10-70 weight-% mineral filler, preferably 16-61 weight-% mineral filler selected from kaolin, titanium dioxide, calcium carbonate, sodium bicarbonate, and mixtures thereof; and 0.5-10 weight-% binder, preferably 0.5-3 weight-% acrylic binder.

The fine absorbent fibers may have a length of 1-3 millimeters and a moisture content of less than 15 weight-%, and may be cellulosic fibers selected from the group consisting of wood dust, paper fibers, vegetable fibers, and mixtures thereof. The zeolite may be clinoptilolite having a particle size range with the range 10 to 100 microns and having a moisture content of less than 12 weight-%. The mineral filler may have a particle size range within the range 10 to 150 microns and a moisture content of less than 12 weight-%, and may be selected from lime, fly ash, dolomite, calcium carbonate, and mixtures thereof. The acrylic binder may be an acrylic/methacrylic copolymer in aqueous dispersion.

The animal litter granule of this invention may further include 0.5-3 weight-% of a boron compound urease inhibitor, for instance, boric acid having a particle size range within the range 10 to 100, U.S. Sieve Series, and having a moisture content of less than 10 weight-%. The granule alternatively or additionally may further include 1-3 weight-% of a pH buffer for maintaining the pH of the granule below 7.0. In a preferred embodiment, the pH buffer maintains the pH of the granule at a pH of approximately 6.0 and is selected from potassium phosphate and sodium bicarbonate. The granule alternatively or additionally may further include 1-4 weight-% dry binder, for instance selected from starch, guar gum, and mixtures thereof. In a preferred embodiment, the dry binder is unmodified starch granules, 70% of which pass through 200 Mesh U.S. Sieve Series.

A particularly preferred embodiment of the animal litter granule of this invention consists essentially of a dry blend of 38 weight-% fine absorbent wood fibers, 25 weight-% clinoptilolite, 31½ weight-% calcium carbonate filler, 2 weight-% boric acid, 1½ weight-% potassium phosphate buffer, and 2 weight-% unmodified starch binder, with 1.7 weight-% acrylate/methacrylate copolymer binder being applied to the dry blend in the form of an aqueous dispersion.

This invention also provides a method of making an animal litter granule. The steps of the method include: a) preparing a homogenous mixture comprising 20-50 weight-% fine absorbent fibers, 10-30 weight-% zeolite, 10-70 weight-% mineral filler, and optionally one or more of 0.5-3 weight-% of a boron compound urease inhibitor, 1-3 weight-% of a pH buffer for maintaining the pH of the granule below 7.0, and 1-4 weight-% dry binder; b) preparing an aqueous dispersion of a binder; c) wetting the mixture prepared in step a) with the aqueous dispersion prepared in step b) to the extent that the wetted mixture contains 0.5-10 weight-% binder; d) agglomerating the wetted mixture prepared in step c) to prepare agglomerated particles; optionally e) screening the wet particles to remove those larger than 5 millimeters in diameter and, optionally, after crushing the oversize particles, conveying them back to the agglomeration stage; f) drying the wetted agglomerated particles prepared in step d) to prepare the desired animal litter granules; and optionally g) screening the dry granules prepared in step f) and selecting as the desired animal litter granules those granules that pass a 4 Mesh screen but are retained on a 30 Mesh screen (U.S. Sieve Series).

An alternative method, of making animal litter pellets in accordance with this invention, includes the steps of:: a) preparing a homogenous mixture comprising 20-50 weight-% fine absorbent fibers, 10-30 weight-% zeolite, 10-70 weight-% mineral filler, and optionally one or more of 0.5-3 weight-% of a boron compound urease inhibitor, 1-3 weight-% of a pH buffer for maintaining the pH of the granule below 7.0, and 1-4 weight-% dry binder; b) preparing an aqueous dispersion of an acrylic binder; c) wetting the mixture prepared in step a) with the aqueous dispersion prepared in step b) to the extent that the wetted mixture contains 0.5-10 weight-% binder; d) forming the wetted mixture into damp pellets; e) drying the damp pellets prepared in step d) to prepare dry pellets; and f) screening the dry pellets prepared in step e) and selecting as the desired animal litter pellets those pellets that pass a 4 Mesh screen but are retained on a 30 Mesh screen (U.S. Sieve Series).

DETAILED DESCRIPTION OF THE INVENTION

The products of the present invention are non-clumping animal litters that comprise a plurality of discrete, artificial granules containing mineral as well as organic-type materials. The granules of this invention deliver excellent levels of malodor absorption, adsorption, and prevention.

The term "granule," as used herein, refers to any particulate form of matter such as particles, chips, pellets, and the like. The granules of the present invention generally have a mean particle size in the range of about 0.6 to about 5.0 millimeters, that is, from about 30 Mesh to about 4 Mesh, U.S. Sieve Series. For a tabulation of U.S. Sieve Series screen nomenclature, see Perry's Chemical Engineering Handbook, 6th Ed., McGraw-Hill, Inc., New York, N.Y. (1984), p. 21-15 (Table 21-6).

Preferably, the granule is made with absorbent natural or artificial fibers, natural or artificial zeolite, urease inhibitor, pH buffer, binders, and mineral filler. More preferably, the fibers are cellulose fibers, most preferably, fine wood fibers, and the granules incorporate as binders both unmodified starch and acrylic copolymer in aqueous dispersion.

In further embodiments of this invention, functional additives such as bactericides, deodorizers, de-dusting agents, and/or perfumes may be sprayed onto the litter granules. Additionally or alternatively, such functional additives may be added as part of the dry mix that is used to manufacture the absorbent granule of this invention.

The animal litter granules of this invention generally range in size from 0.6 through 5.0 mm. Generally, the granules of the present invention are screened to select those which pass through a 4 Mesh screen and are retained on a 30 Mesh screen (U.S. Sieve Series).

This invention also includes a process for producing the absorbent granules. More specifically, this invention provides a process for preparing granules from fine dry powdered materials, including the preparation of discrete dry mix and its agglomeration into coherent, unified, generally spherical, granule.

Materials that may be employed in practicing the present invention are known for their capabilities to contribute to the task of controlling malodors, and some have previously been used in prior art clumping and non-clumping litters. The present invention is distinguished from such prior art, however, by its unique powder-only recipes, by its novel use of zeolite in fine powder form (mixing the zeolite and fibers into an engineered substrate), by its dust free characteristics, by its uniform granules (wherein every granule homogeneously contains all of the ingredients), by the unique strength of its substrate structure, by its ability to retain the granular shape for the duration of usage without falling apart, and by its ability to release moisture quickly, thus preventing malodors from developing.

Specifically, this invention provides an animal litter granule that includes 25-45 weight-% dry cellulose fine fibers, 16-61 weight-% dry mineral filler such as calcium carbonate, 1-4 weight-% dry binder such as unmodified starch, 12-30 weight-% dry zeolite, 0.5-3 weight-% of a dry powder or liquid boron compound (urease inhibitor) such as boric acid, 1-3 weight-% dry pH buffer (typically, moderate pH 6 buffer such as potassium phosphate or sodium bicarbonate), and 0.5%-3% aqueous acrylic binder.

The aqueous acrylic binder is an acrylic copolymer in aqueous dispersion that is applied together with the water in the agglomeration process. Activated by heat in the dryer, the objective of this binder is to maintain granule integrity for the duration of its usage in a wet environment.

The Granule

The functional role of the granule in the litter of this invention is to absorb liquid excretions, to chemically bind malodor-producing nitrogen and sulfur compounds deposited in a body of litter and to enable quick release of the aqueous content of that excreta, through evaporation, leaving the granule ready to re-absorb liquids again and again and again. While in "saturated" mode, the role of the granule is to prevent the bacterial decomposition of urine, and to ensure that decomposed urine stays in non-volatile ammonium ion form rather than in volatile ammonia mode.

The granule is produced from a dry mix of fine fibers, non-clumping minerals, binders, urease inhibitors, and pH buffers. In addition to these basic components of the granule, other malodor suppression materials such as yucca-derived substances and/or cyclodextrenes may be included within the dry blend mixture that makes up the core of the absorbent granule of this invention.

The Cellulose Fibers. The cellulose fibers serve as structural skeletons for the granules of the invention. However, they also function as highly absorbent materials, and are most effective malodor reducers due to their low pH (below 6.0) and high binding capabilities with regard to sulfur compounds. The cellulose fibers also contribute to the formation of cavities (pores) within the cores, thus improving liquid evaporation and reducing product weight. The fiber size distribution of the cellulose fibers in the granule should be such that the combination of short and long fibers will contribute to the development of a strong yet open structure that will allow liquids to penetrate into the core. The dry cellulose fine fibers have a length of at most 5 millimeters and have a moisture content of less than 15 weight-%. Typically, the dry cellulose fine fibers are wood dust, paper fibers, organic fibers, and mixtures thereof. Any absorptive fiber, natural or artificial, though, may in principle be used for this purpose. However, wood fibers, particularly those recovered from waste sources, function well and often have cost and environmental advantages.

The Filler. The mineral in the granule is a filler, which gives the granule its desired specific weight and which helps to maintain a low pH level. Fillers that may be used include kaolin, titanium dioxide, calcium carbonate, sodium bicarbonate, and mixtures thereof. In accordance with the present invention, the filler is normally a mineral that does not swell appreciably when it is wetted. In a preferred embodiment of the invention, this filler is a lime derivative, e.g., lime itself, fly ash, dolomite, calcium carbonate, and mixtures thereof, although any inert, low pH mineral, light color, that has a high specific weight and is capable of supplying fine particles, will do. Calcium carbonate is currently preferred. Generally, the dry mineral filler has a particle size range within the range 10 to 150 microns, and has a moisture content of less than 12 weight-%. Preferably, at least 75% of the mineral filler particles pass through 200 Mesh U.S. Sieve Series.

The Zeolites. Zeolites have high action exchange capacities as well as natural capabilities to act as molecular sieves. In this invention, they may be used to trap and bind ammonium ions. In the present invention, therefore, zeolite is used as the key ammonia odor control platform, complemented by the boric acid as a urease inhibitor, by trapping and absorbing volatile ammonia and preventing it from evaporating into the environment where the animal litter is deployed. Zeolites that may be used in accordance with this invention include those disclosed in U.S. Pat. No. 6,287,550 B1 from line 57 in column 12 through line 57 in column 13. Zeolites suitable for use in the animal litters of the present invention are also disclosed in U.S. Pat. No. 6,276,300 B1. The entire contents of U.S. Pat. Nos. 6,287,550 B1 and 6,276,300 B1 are hereby expressly incorporated by reference. A zeolite that is especially useful in the present invention is clinoptilolite having a particle size range within the range 10 to 100 microns and having a moisture content of less than 12 weight-%.

An important innovation embodied in the present invention is that its use of zeolite powder in combination with other materials enables optimal and cost-effective use of the zeolite. Zeolite alone fails to deliver all of the performance parameters required of a non-clumping litter. Simply mixing small amounts of relatively large zeolite particles with a traditional clay litter is ineffective. Combining the highly effective odor control properties of zeolite with the benefits of cellulose fibers (light weight, dust elimination, and improved binding of malodorous sulfur compounds) to form homogenous granules, each containing both zeolite and fiber, provides a litter that is both economical and highly effective.

The Urease Inhibitor. A urease inhibitor, typically a boron compound such as boric acid, may be mixed into the dry mix complex to prevent hydrolysis of urine to urea and volatile ammonia, which occurs when urease-producing bacteria are present. In accordance with this aspect of the present invention, the boron compound in the granule is preferably boric acid having a particle size range distributed within the range 10 to 100 microns, and having a moisture content of less than 10 weight-%. Further disclosure of urease inhibitors that may be used in accordance with this invention are those discussed from line 20 in column 6 through line 27 in column 10 of U.S. Pat. No. 6,287,550 B1, the entire contents of which are hereby expressly incorporated by reference. An important contribution of the present invention is that its use of urease inhibitor powder in combination with other materials enables optimal and cost-effective use of the urease inhibitor.

The Buffer. The pH of the granule is approximately 6.0-6.5. At this pH, ammonia is mostly present as non-volatile ammonium ions. The use of a pH buffer, e.g., sodium bicarbonate is intended to maintain the pH at that level, even if some ammonia is created by bacterial action, inasmuch as one of the effects of such ammonia production activity is pH increase.

The Binders. A binder assists the cellulose fibers in providing structural form to the granule during the production process. Another major function of binders in this invention is to give the granule its long-term strength in wet environments, environments in which other products tend to fall apart or become "muddy". One objective of maintaining the granule shape intact is to maintain the ability of air to flow between the granules and carrying moisture out of the litter box. Also, if granules were to break down, the resulting small particles could get into a cat's paws and be tracked out of the litter box. Thus the binder component makes an important contribution to product performance. Binders may be selected from amongst organic binders, synthetic binders, and polymeric binders including superabsorbent polymers. The latter provide not only binding effects but also increased absorption. Typical specific binders that may be used in this invention include starch, acrylic polymer, polyvinyl acetate, guar gum, and mixtures thereof. The amount of each binder that can be used in this invention generally ranges from 0.5% by weight of the granule to 3% by weight of the granule. Less would generally not provide sufficient wet strength. More would not be unduly deleterious, but it will generally not be economical.

It is currently preferred in this invention to employ an internal binder made, for instance, of a dry starch powder that dissolves well in cold water, such as unmodified starch granules at least 70% of which pass through 200 Mesh (U.S. Sieve Series) and an external binder. The external binder is most conveniently applied as an aqueous spray subsequent to initial formation of granules. Acrylic/methacrylic copolymer, made by a conventional emulsion polymerization technique and having a polymer solids content of approximately 45-55 weight-% in aqueous dispersion, is particularly convenient as the external binder. The acrylic binder keeps and holds the shape of the granules during usage of the product, that is, when the granules are wetted. It has been found that acrylic binder is strong, easy to apply, and does not adversely affect absorbency or other important characteristics of the product. However, other aqueous binder systems could conceptually be employed. U.S. Pat. No. 4,129,094, the entire disclosure of which is hereby expressly incorporated by reference, discloses the treatment of animal litters with aqueous dispersions of such synthetic hydrophilic polymer binders, which may be used in the present invention, as polyvinyl alcohol, polyacrylic acid, polymethacrylic acid, polyacrylamide, hydroxyalkyl methacrylates, and hydroxyalkyl acrylates.

Optional Functional Additives. In further embodiments of this invention, functional additives such as antimicrobials (bacteristats, bactericides, and fungicides), deodorizers, de-dusting agents, and/or perfumes may be sprayed onto the litter granules, and/or they may be added as part of the dry mix of the synthetic granule of this invention. Antimicrobials that may be used in accordance with this invention include those discussed from line 28 in column 10 through line 15 in column 12 of U.S. Pat. No. 6,287,550 B1. Cyclodextrins and other odor absorbing materials that may be used in accordance with this invention include disclosed from line 58 in column 13 through line 20 in column 17 of U.S. Pat. No. 6,287,550 B1. De-dusting agents are well known to those skilled in the art. A typical de-dusting agent is polytetrafluoroethylene. Perfumes that may be used in accordance with this invention include those disclosed in U.S. Pat. No. 6,287,550 B1 from line 21 in column 17 through line 46 in column 24. The entire contents of U.S. Pat. No. 6,287,550 B1 are hereby expressly incorporated by reference.

Another key innovation of the granule of this invention is its structural configuration (the unique fiber skeleton interlaced with minerals) which enables quick absorption and the subsequent quick release of water vapor, keeping the granule relatively dry and ready to re-absorb liquids, all the while binding sulfur and nitrogen molecules and adsorbing gaseous compounds, and thus effectively reducing malodor production substantially.

The Process

The present invention also contemplates methods of making an animal litter granule as described above. The method of the invention includes the steps of: preparing a homogenous core mixture comprising dry cellulose fine fibers, dry mineral filler, dry zeolite powder, a boron compound, pH buffer, and binders; wetting the mixture with a liquid binder dispersed in water; agglomerating the wetted mixture to prepare wet agglomerated particles; and drying the particles to prepare the desired animal litter granules.

The process of this invention includes several manufacturing stages, namely: dry blend preparation; agglomeration in a preferred embodiment or, optionally, pelletization; wet screening; drying; dry screening; recycling; and spraying.

Dry Blend Preparation. In this stage, a bulk mixture of components in the desired weight ratios is prepared. Each scheduled component is dosed in turn from a weighing station into a hopper. Once all of the components are in the hopper, the unmixed batch is conveyed to a mixer. The components, which at this point differ in bulk density and texture, require intensive mixing to achieve a good mix. A typical mixing procedure mixes each batch for from 60 to 90 seconds in a plowshare-type high-speed mixer. Once well mixed, each batch is conveyed to a surge and combined with other batches having the same component weight ratios.

Agglomeration. This stage creates the granules from a dry blend of core components. Dry blend is dosed continuously into a pin mixer. At the same time, water premixed with liquid binder is injected into the pin mixer at several different locations. High-speed rotation of the wetted blend within the pin mixer creates "seeds" or small particles of the blended materials. The wetted blend is then transferred to an agglomeration pan, where agglomeration is completed. In the agglomeration pan, more material accumulates around each seed, creating a granule. Parameters such as granule size and weight can be controlled in this stage by changing the blend/water ratio as well as by changing the speed and/or inclination of the pin mixer and/or the agglomeration pan.

Wet Screening. By the time the smaller granules are large enough for further processing, it is often found that some of the granules have become too large for use in the present invention. In this case, all of the granules are passed through a screener in order to screen out the oversized particles. Measures known to those skilled in the art can be employed to ensure that the screener is not "blinded" by the wet granules. This step can be omitted when the percentage of oversized granules is small. The oversized granules are recycled to the Agglomeration stage.

Drying. In this stage, wet granules are dried to reach their final moisture level. Perforated belt dryers are employed to remove the necessary amount of moisture from each granule. The desired final moisture content, generally from about 4% to about 8% is achieved by controlling the air temperature and granule throughput in the dryer.

Dry Screening. Once dried, the batch of granules of this invention is screened to remove both oversized granules and undersized granules, and to provide a litter product having a uniform granule size profile. Those skilled in the art are familiar with appropriate screening technology and the use of such devices as vibrating and rolling machines. The oversized and undersized granules are recycled to the Dry Blend Preparation stage.

Spraying. Additives such as de-dusting agents, antimicrobial agents, perfumes, deodorizers can be spayed onto the finished product to improve dust control, shelf life, and product odor profile. Spraying is generally conducted in an enclosed spray chamber.

Pelletization. In an alternative embodiment, this invention contemplates a method of making animal litter pellets, which method comprises the steps of: preparing a homogenous mixture comprising 25-45 weight-% fine absorbent fibers, 12-30 weight-% zeolite, 16-61 weight-% non-clumping mineral filler, and optionally one or more of 0.5-3 weight-% of a boron compound urease inhibitor, 1-3 weight-% of a pH buffer for maintaining the pH of the granule below 7.0, and 1-4 weight-% dry binder; b) preparing an aqueous dispersion of an acrylic binder; c) wetting the mixture prepared in step a) with the aqueous dispersion prepared in step b) to the extent that the wetted mixture contains 0.5-3 weight-% acrylic binder; d) forming the wetted mixture into damp pellets; e) drying the damp pellets prepared in step d) to prepare dry pellets; and f) screening the dry pellets prepared in step e) and selecting as the desired animal litter pellets those pellets that pass a 4 Mesh screen but are retained on a 30 Mesh screen (U.S. Sieve Series). Pelletizing procedures that can be used in step d) are well known to those skilled in the art. One such process is disclosed in U.S. Pat. No. 6,401,662 B1, the entire disclosure of which is hereby expressly incorporated by reference.

Packaging. Those skilled in the art are well aware of various methods in which animal litters may be packaged to make them convenient for use by consumers. Packaging options include for instance bagging and boxing, as disclosed in U.S. Pat. No. 6,089,190, the entire disclosure of which is hereby expressly incorporated by reference.

WORKING EXAMPLE

|  | Percentages |
| --- | --- |
|  | Dry Blend |
| Wood fibers | 38.0% |
| Zeolite (clinoptilolite) | 25.0% |
| Boric acid | 2.0% |
| Calcium carbonate | 31.5% |
| Unmodified starch binder | 2.0% |
| Potassium phosphate buffer | 1.5% |
| Total Dry Blend | 100% |
|  | Aqueous Binder |
| Acrylate/methacrylate copolymer binder | 1.7% |

Benefits

The product of the present invention is characterized by excellent long lasting odor control, high absorbency, freedom from dust, lightness of weight, and a clean and fresh "look" of the litter box throughout the usage period. As such, it is superior to conventional non-clumping animal litters.

What is claimed is:

1. A non-clumping granular animal litter, wherein each granule has a mean particle size in the range of 0.6 mm to 5.0 mm and each granule is made from a mixture which comprises
   20-50 weight-% fine absorbent wood fibers having a moisture content of less than 15 weight-%,
   10-30 weight-% zeolite,
   0.5-3 weight-% boron compound urease inhibitor,
   10-70 weight-% non-swelling mineral filler having a moisture content of less than 12 weight-%, and
   0.5-10 weight-% binder component,
   wherein an aqueous dispersion of binder is applied to the wood fibers, zeolite, boron compound, and mineral filler prior to agglomeration of the mixture into particles.

2. The non-clumping animal litter granule of claim 1, wherein the zeolite is clinoptilolite having a particle size range with the range 10 to 100 microns and having a moisture content of less than 12 weight-%.

3. The non-clumping animal litter granule of claim 1, wherein the urease inhibitor is boric acid having a particle size range within the range 10 to 100, U.S. Sieve Series, and having a moisture content of less than 10 weight-%.

4. The non-clumping animal litter granule of claim 1, further comprising 1-3 weight-% of a pH buffer for maintaining the pH of the granule below 7.0.

5. The non-clumping animal litter granule of claim 4, wherein the pH buffer maintains the pH of the granule at a pH of approximately 6.0 and wherein the pH buffer is selected from the group consisting of potassium phosphate and sodium bicarbonate.

6. The non-clumping animal litter granule of claim 1, further comprising 1-4 weight-% dry binder.

7. The non-clumping animal litter granule of claim 6, wherein the dry binder is selected from the group consisting of starch, guar gum, and mixtures thereof.

8. The non-clumping animal litter granule of claim 7, wherein the dry binder is unmodified starch granules, 70% of which pass through 200 Mesh U.S. Sieve Series.

9. The non-clumping animal litter granule of claim 1, consisting essentially of a dry blend of 38 weight-% fine absorbent wood fibers, 25 weight-% clinoptilolite, 31½ weight-% calcium carbonate filler, 2 weight-% boric acid, 1½ weight-% potassium phosphate buffer, and 2 weight-% unmodified starch binder, and 1.7 weight-% acrylate/methacrylate copolymer binder applied to the dry blend in the form of an aqueous dispersion.

10. The non-clumping animal litter granule of claim 1, wherein the fine absorbent wood fibers comprise wood dust, the non-swelling mineral filler comprises calcium carbonate, and the binder component comprises starch.

* * * * *